United States Patent
Yu et al.

(10) Patent No.: US 11,350,235 B2
(45) Date of Patent: May 31, 2022

(54) SYSTEMS AND METHODS FOR A COMPOUND SENSOR SYSTEM

(71) Applicant: Tinoq Inc., San Jose, CA (US)

(72) Inventors: Daxiao Yu, Cupertino, CA (US); Yang Sun, San Jose, CA (US); Chan-Soo Hwang, Sunnyvale, CA (US)

(73) Assignee: Tinoq Inc., San Jose, CA (US)

( * ) Notice: Subject to any disclaimer, the term of this patent is extended or adjusted under 35 U.S.C. 154(b) by 0 days.

(21) Appl. No.: 16/938,966

(22) Filed: Jul. 25, 2020

(65) Prior Publication Data
US 2020/0359165 A1    Nov. 12, 2020

Related U.S. Application Data

(63) Continuation of application No. 15/453,703, filed on Mar. 8, 2017, now Pat. No. 10,728,694.
(Continued)

(51) Int. Cl.
*H04W 4/02* (2018.01)
*H04W 4/021* (2018.01)
(Continued)

(52) U.S. Cl.
CPC ........... *H04W 4/021* (2013.01); *G01J 1/0219* (2013.01); *G01J 1/0228* (2013.01); *G01J 1/0247* (2013.01);
(Continued)

(58) Field of Classification Search
CPC .. H04W 4/021; G06F 1/3231; G06F 16/5838; G06F 1/3287; H04L 67/1097;
(Continued)

(56) References Cited

U.S. PATENT DOCUMENTS 7,602,421 B2    10/2009   Hunter et al.
9,300,925 B1    3/2016    Zhang
(Continued)

OTHER PUBLICATIONS

Omron. Technical Explanation for Proximity Sensors. Percision Automation. May 26, 2019. [retrieved on Apr. 22, 2021]. Retrieved from the Internet <URL: https://precisionautomation.net/2019/05/26/technical-explanation-for-proximity-sensors/> (Year: 2019).*

(Continued)

*Primary Examiner* — Nader Bolourchi
(74) *Attorney, Agent, or Firm* — North Weber & Baugh LLP; Michael North

(57) ABSTRACT

A compound sensor system includes a first sensor, a second sensor, a memory that stores a module, and a processor coupled to the first sensor, the second sensor, and the memory. The first sensor is configured to detect a parameter that indicates a likelihood of having a user enter or leave a target area, and, in response, send a first command signal to the processor. The processor is configured to receive the first command signal from the first sensor and send a second command signal to the second sensor based on receiving the first command signal. The second sensor is configured to operate at a sleep mode and switch to an active mode upon receiving the second command signal, and during the active mode the second sensor is configured to determine if the user enters or leaves the target area.

16 Claims, 4 Drawing Sheets

Related U.S. Application Data

(60) Provisional application No. 62/314,993, filed on Mar. 30, 2016, provisional application No. 62/310,524, filed on Mar. 18, 2016, provisional application No. 62/305,504, filed on Mar. 8, 2016.

(51) Int. Cl.

| | |
|---|---|
| *G01S 11/12* | (2006.01) |
| *G01S 11/14* | (2006.01) |
| *G01J 5/12* | (2006.01) |
| *G06F 16/583* | (2019.01) |
| *G01J 1/02* | (2006.01) |
| *G01J 1/42* | (2006.01) |
| *G06F 1/3231* | (2019.01) |
| *G01S 13/04* | (2006.01) |
| *H04L 67/1097* | (2022.01) |
| *G06F 1/3287* | (2019.01) |
| *H04L 67/52* | (2022.01) |
| *H04L 67/56* | (2022.01) |
| *H04L 67/12* | (2022.01) |
| *G01S 15/04* | (2006.01) |
| *G01S 17/04* | (2020.01) |
| *G06V 20/52* | (2022.01) |
| *G06V 40/16* | (2022.01) |
| *H04L 67/1004* | (2022.01) |

(52) U.S. Cl.
CPC .............. *G01J 1/4204* (2013.01); *G01J 5/12* (2013.01); *G01S 11/12* (2013.01); *G01S 11/14* (2013.01); *G01S 13/04* (2013.01); *G01S 15/04* (2013.01); *G01S 17/04* (2020.01); *G06F 1/3231* (2013.01); *G06F 1/3287* (2013.01); *G06F 16/5838* (2019.01); *G06V 20/52* (2022.01); *G06V 40/172* (2022.01); *H04L 67/1097* (2013.01); *H04L 67/12* (2013.01); *H04L 67/18* (2013.01); *H04L 67/28* (2013.01); *H04L 67/1004* (2013.01)

(58) Field of Classification Search
CPC ......... H04L 67/18; H04L 67/12; H04L 67/28; H04L 67/10; G01J 5/12; G01J 1/0219; G01J 1/4204; G01J 1/0228; G01J 1/0247; G01S 13/04; G01S 11/14; G01S 11/12; G01S 17/04; G01S 15/04; G06K 9/00771; G06K 9/00288

See application file for complete search history.

(56) References Cited

U.S. PATENT DOCUMENTS

| | | | | |
|---|---|---|---|---|
| 2008/0234935 | A1* | 9/2008 | Wolf | ............... G01C 21/00 |
| | | | | 701/472 |
| 2014/0107846 | A1* | 4/2014 | Li | ........................ F24F 11/30 |
| | | | | 700/275 |
| 2015/0133823 | A1 | 5/2015 | Houmanfar et al. | |
| 2018/0336687 | A1 | 11/2018 | Mudretsov et al. | |

OTHER PUBLICATIONS

Non-Final Office Action dated Aug. 5, 2020, in related U.S. Appl. No. 16/355,688, (48 pgs).
Non-Final Office Action dated Sep. 10, 2020, in related U.S. Appl. No. 15/262,494, (24 pgs).
Notice of Allowance dated Oct. 7, 2020 in the related U.S. Appl. No. 16/355,683, (20 pgs).
Notice tof Allowance dated Nov. 18, 2020 in the related U.S. Appl. No. 16/355,688, (15 pgs).
Notice to Grant Patent Right dated Oct. 30, 2020 in the related CN Application No. 201780022142.X, 4 pgs).
Advisory Action dated Apr. 9, 2021 in related U.S. Appl. No. 15/262,494, filed Sep. 12, 2016, (9 pgs).
Final Office Action dated Jan. 29, 2021 in the related U.S. Appl. No. 15/262,494, (41 pgs).
Final Office Action Response filed Mar. 29, 2021 in the related U.S. Appl. No. 15/262,494, (14 pgs).
Response to Advisory Action filed Apr. 28, 2021 in related U.S. Appl. No. 15/262,494, filed Sep. 12, 2016, (15 pgs).
Final Office Action dated Aug. 23, 2021 in related U.S. Appl. No. 15/262,494, (24 pgs).
Final Office Action Response filed Nov. 22, 2021 in related U.S. Appl. No. 15/262,494, (14 pgs).
Chinese Office Action dated Oct. 13, 2021 in related Chinese application No. 201780023510.2, (14 pgs).
Chinese Office Action Response filed Jan. 3, 2022 in related Chinese application No. 201780023510.2, (3 pgs).
Final Office Action dated Dec. 2, 2021 in related U.S. Appl. No. 15/262,494, (26 pgs).
Final Office Action dated May 10, 2021 in related U.S. Appl. No. 15/262,494, (30 pgs).
Final Office Action Response filed Jul. 8, 2021 in related U.S. Appl. No. 15/262,494, (14 pgs).
Advisory Action dated Jul. 15, 2021 in related U.S. Appl. No. 15/262,494, (6 pgs).

* cited by examiner

SYSTEMS AND METHODS FOR A COMPOUND SENSOR SYSTEM

CROSS REFERENCE TO RELATED PATENT APPLICATIONS

The present application is a Continuation of, and claims priority benefit, under 35 U.S.C. § 119(e), to co-pending and commonly assigned U.S. patent application Ser. No. 15/453,703, and filed on Mar. 8, 2017, entitled "SYSTEMS AND METHODS FOR A COMPOUND SENSOR SYSTEM", listing as inventors Daxiao Yu, and Yang Sun, which claims priority benefit under 35 USC § 119(e) to commonly-assigned U.S. Provisional Application No. 62/314,993, filed on Mar. 3, 2016, entitled "FACE DETECTION AND RECOGNITION FOR GYM DATA COLLECTION", listing as inventor, Yang Sun, which claims priority benefit, under 35 U.S.C. § 119(e), to commonly-assigned U.S. Provisional Application No. 62/310,524, filed on Mar. 18, 2016, entitled "FACE RECOGNITION ALGORITHM FOR SMART FITNESS EQUIPMENT", listing as inventors, Yan Sun, and Daxiao Yu, which claims priority benefit, under 35 U.S.C. § 119(e), to commonly-assigned U.S. Provisional Application No. 62/305,504, filed on Mar. 8, 2016, entitled "HYBRID PROXIMITY SENSOR FOR SMART FITNESS EQUIPMENT," listing as inventors Yang Sun, and Daxiao Yu, which application are incorporated by reference in their entireties.

BACKGROUND

A. Technical Field

This invention relates generally to the field of low power sensor systems.

B. Description of the Related Art

Proximity sensors, such as touch screens for cellphones and touch switch for lights, are widely used in today's consumer and industrial electronics. A proximity sensor typically functions by either (1) responding to a target object or an object's motion when the object is within the sensing range (e.g., a touch screen), or (2) directly detecting the distance between the object and the sensor (e.g. an infrared ranging sensor).

In the application of proximity sensors, the range of interest between the sensor and the target object can be either explicitly or implicitly specified. For example, a touch light switch typically functions only when a hand is placed within around 10 centimeters of the sensor. A three-dimensional (3D) hand gesture detection sensor for smart phones also works in similar ranges. Often, the proximity zone is directional, i.e., objects or motions can only be detected in front of the proximity sensor.

To measure the distance of an object, proximity sensors can use active emissions. Distance is determined by detecting the reflected emissions from the object. Typical emissions by the proximity sensors include infrared, ultrasonic, or any other suitable electromagnetic signals that can be bounced back from a target object. In some embodiments, the basic working principle of the ranging proximity sensor is similar to radars.

Active ranging proximity sensors can accurately sense whether an object is present or a motion happens in its proximity with well-defined range such as 10 centimeters, 35 centimeters, or any other suitable ranges. Traditional proximity sensors, however, typically consume more than 0.5 mA in current, which is less suitable for battery-powered systems. For example, one standard AA battery usually has the capacity of around 1000 mAh and can only support an active ranging proximity sensor for a few months. Design of the battery-operated sensor systems often requires a battery life that is longer than a year.

Therefore, it is desirable to provide methods and systems for a sensor system that consumes low power.

SUMMARY

In accordance with the disclosed subject matter, systems and methods are provided for a low power compound sensor system.

Disclosed subject matter includes, in one aspect, a compound sensor system includes a first sensor, a second sensor, a memory that stores a module, and a processor coupled to the first sensor, the second sensor, and the memory. The first sensor is configured to detect a parameter that indicates a likelihood of having a user enter or leave a target area, and, in response, send a first command signal to the processor. The processor is configured to run the module stored in the memory that is configured to cause the processor to receive the first command signal from the first sensor and send a second command signal to the second sensor based on receiving the first command signal. The second sensor is configured to operate at a sleep mode and switch to an active mode upon receiving the second command signal, and during the active mode the second sensor is configured to determine if the user enters or leaves the target area.

Disclosed subject matter includes, in another aspect, a method of determining a user enters or leave a target area using a compound sensor system. The method includes detecting, using a first sensor of the compound sensor system, a parameter that indicates a likelihood of having a user enter or leave a target area, and, in response, send a first command signal to a processor of the compound sensor system. The method includes sending, from the processor, a second command signal to a second sensor of the compound sensor system based on receiving the first command signal. The method includes switching the second sensor from a sleep mode to an active mode upon receiving the second command signal, and determining, using the second sensor, if the user enters or leaves the target area.

The present disclosure also discloses computer readable media that include executable instructions (e.g., computer program of instructions) operable to cause a device to perform the functions of the apparatuses described above.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

In some embodiments of the present disclosure, a compound sensor system is disclosed to detect whether a user is using an exercise device in a gym in a power efficient way. In some embodiments, the compound sensor includes at least two sensors. One sensor is a low power sensor and can be configured to have a coarse detection. The other sensor is a high power sensor and can be configured to have a fine detection. To save power, the high power/fine sensor can normally operate at a low power/sleep mode. When the low power/coarse sensor detects an object or a motion, the fine sensor is switched on from the sleep mode to confirm whether the object and/or the motion is indeed in its proximity. Overall power consumption of the compound sensor system is reduced by only utilizing the fine/high power sensor when necessary.

Figure 1:
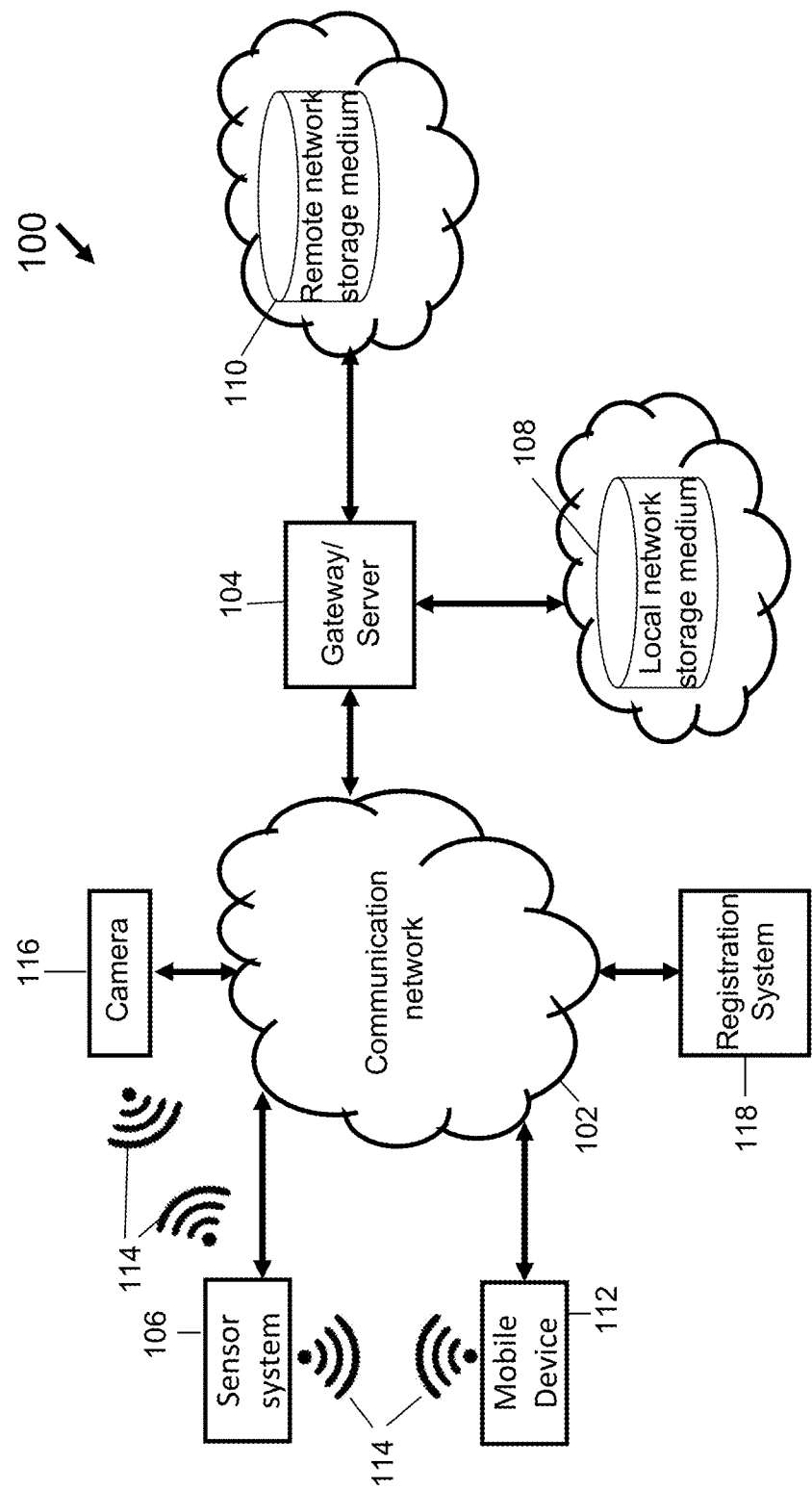
FIG. 1 illustrates an environment for detecting a user's presence and recording the user's activity in a gym according to certain embodiments of the disclosed subject matter.

FIG. 1 illustrates an environment 100 for detecting a user's presence and recording the user's activity in a gym according to certain embodiments of the disclosed subject matter. The environment 100 can include a communication network 102, a server 104, a sensor system 106, a local network storage medium 108, a remote network storage medium 110, a mobile device 112, a wireless network 114, a camera 116, and a registration system 118. Some or all components of the environment 100 can be coupled directly or indirectly to the communication network 102. The components included in the environment 100 can be further broken down into more than one component and/or combined together in any suitable arrangement. For example, in some embodiments, the sensor system 106 and the camera 116 can be combined as one device. Further, one or more components can be rearranged, changed, added, and/or removed. For example, the environment 100 can include more than one sensor system 106, more than one camera 116, and/or more than one mobile device 112. In some embodiments, the environment 100 can also include a tracking device.

The sensor system 106 can be attached to an exercise device. Non-limiting examples of exercise devices include treadmills, ellipticals, exercise bikes, rowing machines, stair climbers, weightlifting benches, weight machines, etc. In some embodiments, the sensor system 106 can be attached to an exercise device non-intrusively. In some embodiments, the sensor system 106 can be taken off from one exercise device and attached to another exercise device. The sensor system 106 can be configured to communicate wirelessly with at least one mobile device 112, the server 104, and/or other suitable components of the environment 100. The sensor system 106 can detect when a user or his or her mobile device 112 enters or leaves a target area of the sensor device 106 and notify other components of the environment 100, such as the mobile device 112, via the wireless network 114 and/or the communication network 102. For example, when the sensor device 106 is attached to a treadmill, then the target area can be above the base of the treadmill. As another example, when the sensor device 106 is attached to a workbench, then the target area can be the area where an exerciser sits or lie on. In some embodiments, the sensor system 106 can sense or detect movements of an exercise device and/or the user using the exercise device. In some embodiments, once the sensor system 106 detects a user is using an exercise device, it can report the detection result to and/or trigger other components of the environment 100. The structure and function of the sensor system 106 are described in more detail below.

The mobile device 112 can be connected to the sensor system 106 via the wireless network 114. In some embodiments, the mobile device 112 can also be configured to communicate wirelessly with the server 104 and/or other suitable components of the environment 100 via the wireless network 114 and/or the communication network 102. The mobile device can be a tablet computer, a personal digital assistant (PDA), a pager, a mobile or smart phone, a wireless sensor, a wearable device, or any other suitable device.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the communication network 102 as a single network; however, the communication network 102 can include multiple interconnected networks listed above.

The server 104 can be a single server, a network of servers, or a farm of servers in a data center. The server 104 can be coupled to a network storage system. The network storage system can include two types of network storage devices: a local network storage medium 108 and a remote network storage medium 110. The local network storage medium 108 and the remote network storage medium 110 can each include at least one physical, non-transitory storage medium, flash memory, a magnetic disk drive, an optical drive, a programmable read-only memory (PROM), a read-only memory (ROM), or any other memory or combination of memories. The local network storage medium 108 and the remote network storage medium 110 can be part of the server 104 or can be separated from the server 104.

In some embodiments, the server 104 can be located within or near a gym or a fitness center. In some embodiments, the server 104 can be located at a remote location. In some embodiments, the server 104 can also include a gateway and/or an access point to direct any signals received from the sensor system 106, the mobile device 112, and/or other components of the environment 100.

In some embodiments, the server 104 manages a database of the registered gym members including registered faces gathered from the registration system 118. In some embodiments, the server 104 also stores the face images captured from the camera 116 and performs face recognition.

In some embodiments, the server 104 manages and stores user exercise data, which is collected by the exercise device with embedded sensors or by sensors attached to the exercise device. In some embodiments, the server 104 stores the exercise data in association with respective users, which can be identified by the face recognition process.

In some embodiments, if during the face recognition process, the server 104 determines that the image quality of the face image is not good enough for recognition, it sends commands back to the camera 116 to retake one or more photos and/or video clips.

In some embodiments, the server 104 may offload some of its computing and/or storage tasks to one or more gateways, as described below.

In some embodiments, the environment 100 may also include one or more gateways that are separate from the server 104. Multiple gateways can be deployed in one gym. In one embodiment, one or more gateway can be used as a communication hub to connect the camera 116 and/or other components of the environment 100 to the server 104.

In some embodiments, besides serving as the communication hub between the camera 116 and/or other components of the environment 100 on one end and the server 104 on the other end, a gateway can also help share the load of computing and reduce data storage required from the server 104. The advantages include, among others, faster response time and lower cloud computing cost.

In some embodiments, a gateway detects faces from one or more photos and/or video clips taken by the camera 116, extracts the face features from the photos, and transmits the extracted features together with the photos to the server 104 for face recognition and image storage.

In some embodiments, the gateway detects faces from the one or more photos and/or video clips taken by the camera 116, extracts the face features from the photos, and performs face recognition locally. In this case, the server 104 only stores the photos received from the gateway. If the gateway determines that the image quality is not good enough for face recognition, it send commands to the camera module to retake one or more photos and restarts the face recognition process.

Furthermore, face recognition tasks can be partitioned and shared between the gateway and the server 104, and the partitioning and sharing can be arranged or rearranged dynamically to meet the face recognition system requirements.

The camera 116 can be attached to an exercise device. In some embodiments, the camera 116 can be attached to an exercise device non-intrusively. In some embodiments, the camera 116 can be taken off from one exercise device and attached to another exercise device. In some embodiments, the camera 116 can be configured to communicate wirelessly with at least one sensor system 106, at least one mobile device 112, the server 104, and/or other suitable components of the environment 100. In some embodiments, the camera 116 can detect when a user starts to use the exercise device that the camera 116 is attached to and start to acquire one or more photos and/or video clips that contain sufficient facial information of one or more users that are near the camera 116. In some embodiments, each exercise device in a gym will have a dedicated camera 116. In some embodiments, one or more exercise devices can share one camera 116.

The registration system 118 typically locates near or at the entrance of a facility. for example, the registration system 118 can locate near or at the entrance of a gym. In some embodiments, when a user enters or leaves a gym, he or she will be registered by the registration system 118. In some embodiments, the registration system 118 also includes a camera, which can be configured to acquire one or more photos and/or video clips of a user who sign in at the gym. In some embodiments, each user may register his or her face multiple times, which in general improve the performance of face recognition algorithms. When a registered user walks in the gym and/or starts on an exercise device, face images of the user captured by the camera 116 associated with the exercise device will be compared against registered faces to identify the correct user.

In some embodiments, during the face registration, registered faces need to be validated by the registration system 118 and/or other suitable components of the environment 100. Validation criteria can include one or more of the following: (1) whether the user has a valid membership, and (2) whether the face images captured at the registration system 118 contain sufficient information for recognition purpose.

Each time a user registers at the registration system 118, his or her face information, such as photos or video clips, can be acquired by one of the following embodiments or any combinations of the following embodiments. In one embodiment, the user's face information can be acquired by the camera associated with the registration system 118. In one embodiment, the user's face information can be retrieved from the gym's member management system, where previously taken photos of gym members can be stored. In one embodiment, the user's face images can be acquired from mobile applications running on the user's mobile device 112 and/or other suitable devices associated with the user.

In some embodiments, the sensor system 106, the camera 116, the mobile device 112, and/or other components of the environment 100 can communicate with each other through the wireless connection 114. The wireless connection can be WiFi, ZigBee, IEEE802.15.4, Bluetooth, near field communication (NFC), or another connection using any other suitable wireless protocol standard or combination of standards. In some embodiments, the wireless connection 114 can be the same as the communication network 102. In some embodiments, the wireless connection 114 can be different from the communication network 102.

Figure 2:
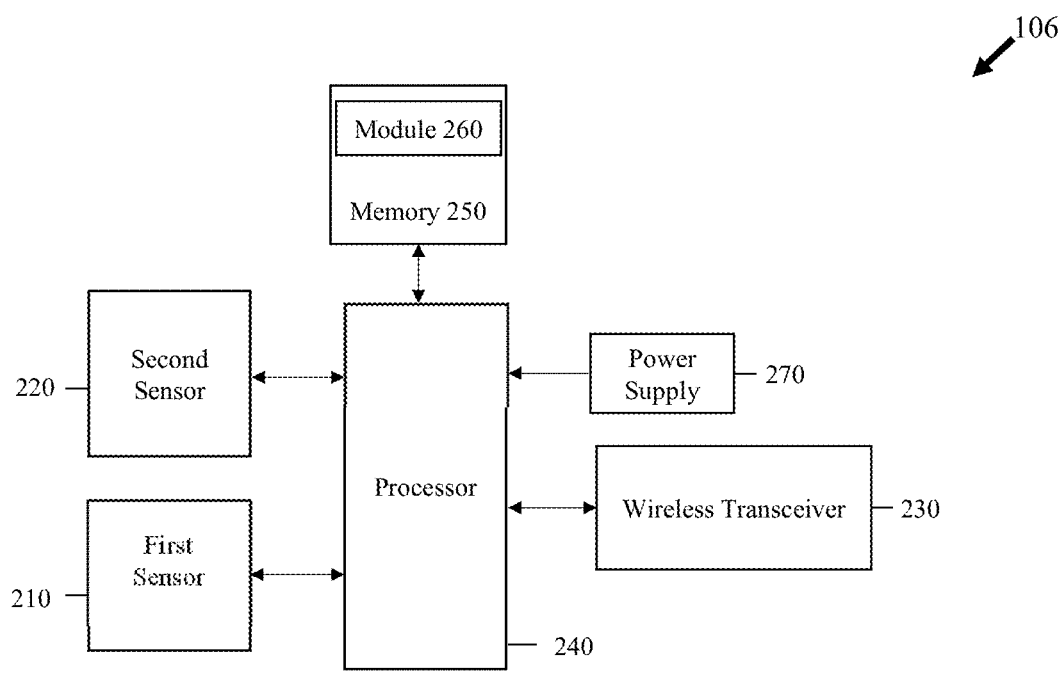
FIG. 2 illustrates a block diagram of a sensor system according to certain embodiments of the present disclosure.

FIG. 2 illustrates a block diagram of a sensor system 106 according to certain embodiments of the present disclosure. The sensor system 106 includes a first sensor 210, a second sensor 220, a wireless transceiver 230, a processor 240, a memory 250, a module 260, and a power supply 270. The components included in the sensor system 106 can be further broken down into more than one component and/or combined together in any suitable arrangement. For example, the first sensor 210 can include one or more sensors. Similarly, the second sensor 220 can include one or more sensors. Further, one or more components can be rearranged, changed, added, and/or removed.

The first sensor 210 is configured to detect a parameter that indicates a likelihood of having a user enter or leave a target area, and, in response, send a first command signal to the processor 240. As discussed above, generally the target area is a specific space or interest that indicates whether a user is using an exercise device.

In some embodiments, the first sensor 210 is or includes a low power coarse proximity sensor with a coarse detection range, and the parameter to be detected by the first sensor 210 is based on a user entering or leaving the coarse detection range of the coarse proximity sensor. In some embodiments, the coarse proximity sensor can be a passive infrared sensor and/or any other suitable sensor.

In some embodiments, the first sensor 210 is or includes a motion sensor with a detection range, and the parameter to be detected by the first sensor 210 is based on detecting a change of motions and/or vibration within the detection range of the motion sensor. In some embodiments, the motion sensor can be an accelerometer and/or any other suitable motion sensor.

In some embodiments, the first sensor 210 is or includes a temperature sensor with a detection range, and the parameter to be detected by the first sensor 210 is based on detecting a change of temperatures within the detection range of the temperature sensor. In some embodiments, the temperature sensor can be an infrared thermopile sensor and/or any other suitable temperature sensor.

In some embodiments, the first sensor 210 can include more than one type of sensor, such as a proximity sensor (for example, a passive infrared sensor), an ambient light sensor, a photoelectric sensor, an ultrasonic sensor, a time of flight distance sensor, a thermopile sensor, or any other suitable sensors or combination of sensors.

The second sensor 220 is configured to more accurately determine whether or not a user enters or leaves a detection area. The second sensor 220 can be configured to send detection results to the processor 240 and/or other suitable components. In some embodiments, the second sensor 220 is or includes a fine proximity sensor with a fine detection range, and the fine proximity sensor determines if the user enters or leaves the target area based on detecting if the user enters or leaves the fine detection range. In some embodiments, the fine proximity sensor is an active ranging sensor, which measures distance by emitting waves and calculating the distance based on the arrival time of the reflected waves. In some embodiments, the fine proximity sensor includes an infrared ranging sensor, an ultrasonic proximity sensor, and/or any other suitable sensor.

In some embodiments, the second sensor 220 is or includes a motion sensor with a detection range, and the parameter to be detected by the first sensor 220 is based on detecting a change of motions and/or vibration within the detection range of the motion sensor. In some embodiments, the motion sensor can be an accelerometer and/or any other suitable motion sensor.

In some embodiments, the second sensor 220 is or includes a temperature sensor with a detection range, and the parameter to be detected by the second sensor 220 is based on detecting a change of temperatures within the detection range of the temperature sensor. In some embodiments, the motion sensor can be an infrared thermopile sensor and/or any other suitable temperature sensor.

In some embodiments, the second sensor 220 can include more than one type of sensor, such as a proximity sensor (for example, a passive infrared sensor), an ambient light sensor, a photoelectric sensor, an ultrasonic sensor, a time of flight distance sensor, a thermopile sensor, or any other suitable sensors or combination of sensors.

In some embodiments, the second sensor 220 has a detection range that is smaller than the detection range of the first sensor 210, but the second sensor 220 can be more accurately detect whether or not a user enters or leaves the detection range of the second sensor 220.

The wireless transceiver 230 can be configured to transmit any detection results of the sensor system 106 to the mobile device 112, the gateway, the server 104, and/or any other components of the environment 100. In some embodiments, the wireless transceiver 230 can also be configured to receive signals from one or more components of the environment 100. In some embodiments, the communication model 230 can enable the communication with other components of the environment 100 via the wireless network 114. In some embodiments, the wireless transceiver 230 can be used as the interface among various components of the sensor system 106.

The processor 240 can include one or more cores and can accommodate one or more threads to run various applications and modules. The software can run on the processor 240 capable of executing computer instructions or computer code. The processor 240 might also be implemented in hardware using an application specific integrated circuit (ASIC), programmable logic array (PLA), field programmable gate array (FPGA), or any other integrated circuit.

The memory 250 can be a non-transitory computer readable medium, flash memory, a magnetic disk drive, an optical drive, a PROM, a ROM, or any other memory or combination of memories.

The processor 240 can be configured to run the module 260 stored in the memory 250 that is configured to cause the processor 240 to perform various steps that are discussed in the disclosed subject matter. For example, the processor 240 can be configured to receive the first commend signal from the first sensor 210 when the first sensor 210 detects a parameter that indicates a likelihood of having a user enter or leave a target area. The processor 240 can be configured to send a second command signal to the second sensor 220 based on receiving the first command signal. In some embodiments, the processor is preferably a low power processor. In some embodiments, the processor 240 can operate in an always-on mode. In some embodiments, the processor 240 can be configured to be in sleep mode and is only switched to an active mode upon receiving the first command signal from the first sensor 210.

The power supply 270 provides power to one or more other components of the sensor system 106. In some embodiments, the power supply 270 can be a battery source. In some embodiments, the power supply 270 can provide alternating current (AC) and/or direct current (DC) power via an external power source. In some embodiments, each of the first sensor 210 and the second sensor 220 has its own power supply.

In some embodiments, the first sensor 210 is designed to consume less than a few hundreds of mircoramps of power. The second sensor 220 generally consumes more power than the first sensor 210. To save power, in some embodiments, the first sensor 210 can also serve as a power control/power switch for the second sensor system 220. For example, only when the first sensor 210 detects that there is a likelihood that a user enters or leaves a target area, can the second sensor 220 be switched on to more accurately determine whether a user enters or leaves the target area. In some embodiments, the second sensor 220 stays in a low power or sleep mode most of the time, and only wakes up to operate when it receives commands from the processor 240. In some embodiments, the sleep mode and the low power mode mean the same thing, and they are referred to a mode that consumes less power than the active mode. Alternatively, the second sensor 220 can also be programmed to be active periodically with a preset timer. When active, it functions for a certain period of time and then goes back to sleep mode. In some embodiments, the second sensor 220 can still receive commands from the processor 240 and/or other components of the sensor system 106 during the sleep mode.

In some embodiments, since the first sensor 210 consumes low power, the first sensor 210 can be configured in always on mode. In some embodiments, the first sensor 210 can be configured to have an active or high power mode and a sleep or low power mode, and the first sensor 210 can periodically transition between these two modes. In some embodiments, the first sensor 210 is configured to have a high duty cycle so that it can stay at the high power/active mode more often. In some embodiments, when both the first sensor 210 and the second sensor 220 are configured to be switching between a high power/active mode and a low power/sleep mode, the first sensor 210 will be stayed at the high power/active mode longer than the second sensor 220 because the first sensor consumes lower power. In some embodiments, processor 240 can periodically send a wake up signal to the first sensor 210 to force the first sensor 210 to be in the high power/active mode.

In some embodiments, the sensor system 106 can be built as an integrated circuit. In some embodiments, the sensor system 106 can be built as a discrete circuit, and one or more components of the sensor system 106 can be built from commercially available components. In some embodiments, the processor 240 can be a standalone component. In some embodiments, the processor 240 can be embedded in the first sensor 210 and/or the second sensor 220.

Figure 3:
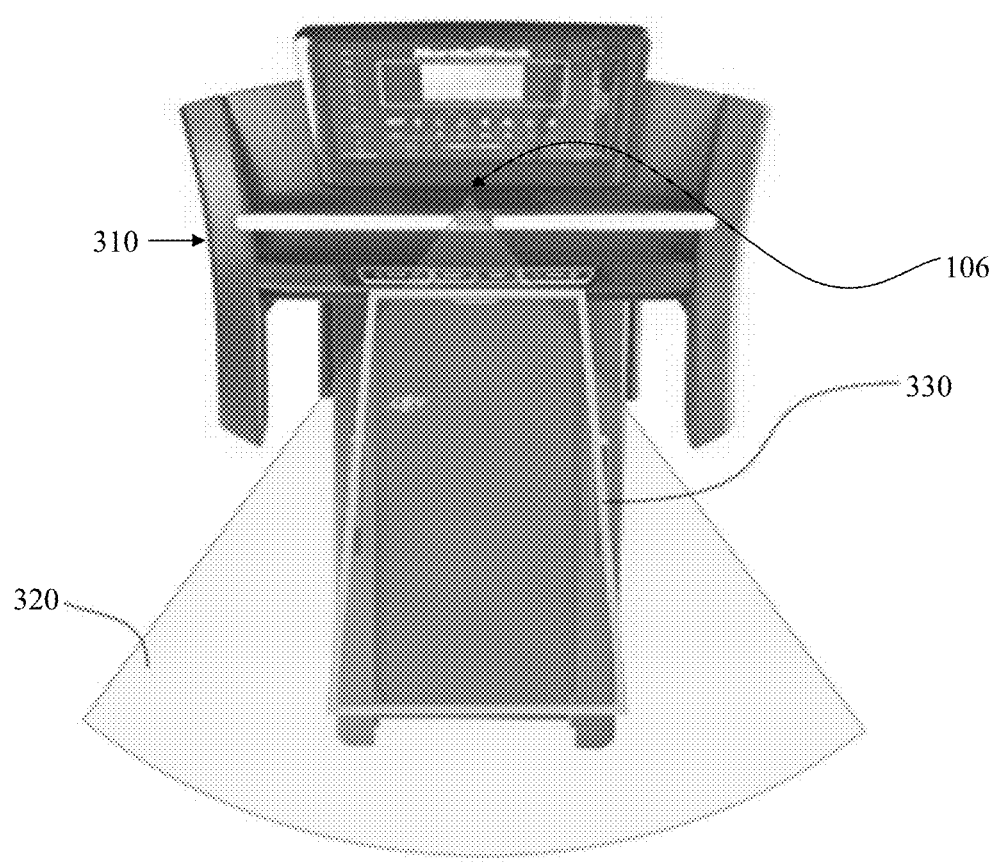
FIG. 3 shows detection ranges of the sensor system according to certain embodiments of the present disclosure.

FIG. 3 shows detection ranges of the sensor system 106 according to certain embodiments of the present disclosure. In FIG. 3, the sensor system 106 is attached to a treadmill 310. As discussed above, the sensor system 106 includes a first sensor 210 and a second sensor 220. In FIG. 3, area 320 represents the detection range of the first sensor 320, and area 330 represent the detection range of the second sensor 220. In FIG. 3, the target area of the sensor system 106 is the space on top of the belt of the treadmill 310. Although the target area in FIG. 3 is shown to be the same as area 330, which is the detection range of the second sensor 220, the target area can be different from the detection range of the second sensor 220 in other cases. As shown in FIG. 3, in some embodiments, the detection range of the first sensor 210 usually overlaps with the detection range of the second sensor 220, but the detection range of the first sensor 210 can cover more area than the target area and the detection range of the second sensor 220. The detection range of the first sensor 210 can be larger than the detection range of the second sensor 220 because the first sensor 210 is designed to be a coarse and low power sensor, so it can sometime respond to activity outside the target area. For example, when the first sensor 210 is an accelerometer sensor, it may respond to vibration sources coming from any direction, not necessarily in the target area of the exercise device.

Figure 4:
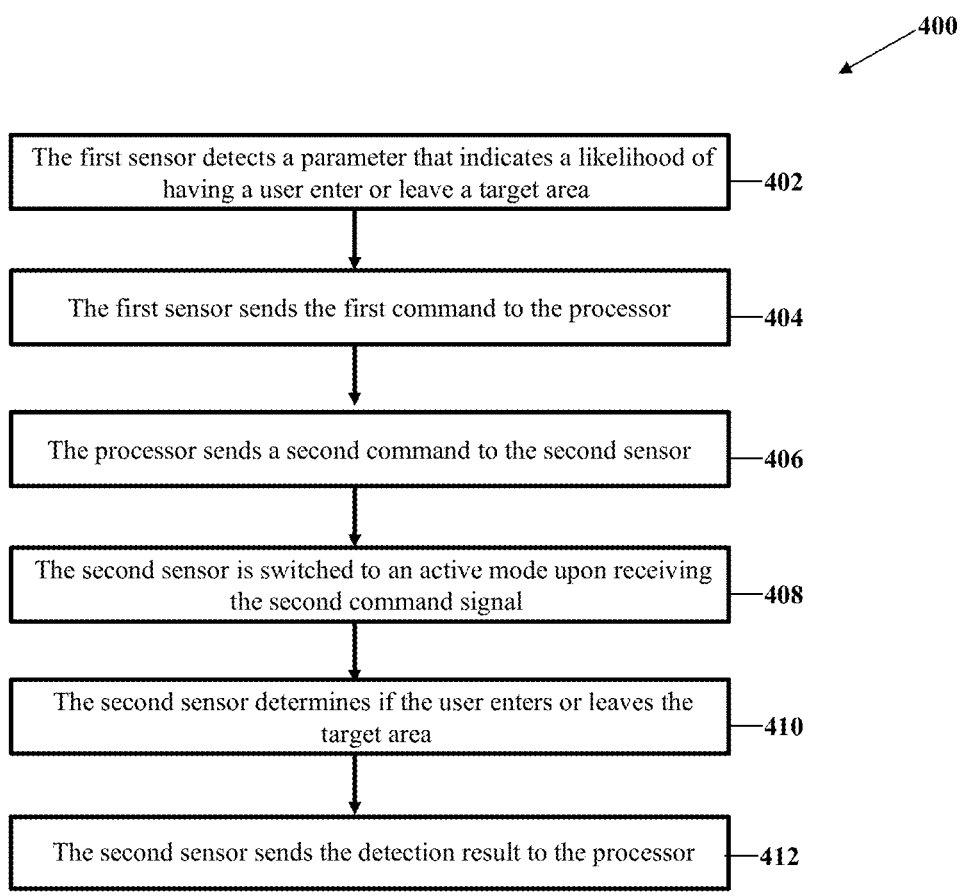
FIG. 4 is a flow chart illustrating a process of detecting whether or not a user enters or leaves a target area of an exercise device according to certain embodiments of the present disclosure.

FIG. 4 is a flow chart illustrating a process 400 of detecting whether or not a user enters or leaves a target area of an exercise device according to certain embodiments of the present disclosure. The process 400 is mainly illustrated from the perspective of the components of the sensor device 106. In some embodiments, the process 400 can be modified by, for example, having steps rearranged, changed, added, and/or removed.

At step 402, the first sensor 210 is configured to detect a parameter that indicates a likelihood of having a user enter or leave a target area. As discussed above, generally the target area is a specific space or interest that indicates whether a user is using an exercise device.

In some embodiments, the first sensor 210 is or includes a low power coarse proximity sensor with a coarse detection range, and the parameter to be detected by the first sensor 210 is based on a user entering or leaving the coarse detection range of the coarse proximity sensor. In some embodiments, the coarse proximity sensor can be a passive infrared sensor and/or any other suitable sensor.

In some embodiments, the first sensor 210 is or includes a motion sensor with a detection range, and the parameter to be detected by the first sensor 210 is based on detecting a change of motions and/or vibration within the detection range of the motion sensor. In some embodiments, the motion sensor can be an accelerometer and/or any other suitable motion sensor.

In some embodiments, the first sensor 210 is or includes a temperature sensor with a detection range, and the parameter to be detected by the first sensor 210 is based on detecting a change of temperatures within the detection range of the temperature sensor. In some embodiments, the motion sensor can be an infrared thermopile sensor and/or any other suitable temperature sensor.

In some embodiments, the first sensor 210 can include more than one type of sensor, such as a proximity sensor (for example, a passive infrared sensor), an ambient light sensor, a photoelectric sensor, an ultrasonic sensor, a time of flight distance sensor, a thermopile sensor, or any other suitable sensors or combination of sensors. The process 400 then proceeds to step 404.

At step 404, the first sensor 210, in response to detecting a parameter that indicates a likelihood of having a user enter or leave a target area, sends a first command signal to the processor 240. The process 400 then proceeds to step 406.

At step 406, the processor 240 receives the first command signal from the first sensor 210 and send a second command signal to the second sensor 220. In some embodiments, the processor 240 can normally operate in a low power mode and switch to a high power/active mode upon receiving the first command signal from the first sensor 210. The process 400 then proceeds to step 408.

At step 408, the second sensor 220, which is normally in a low power/sleep mode, is switched to an active mode upon receiving the second command signal from the processor 240. The process 400 then proceeds to step 410.

At step 410, the second sensor 220 determines if the user enters or leaves the target area of the exercise device that the sensor system 106 is attached to. The process 400 then proceeds to step 412. In some embodiments, the second sensor 220 is or includes a fine proximity sensor with a fine detection range, and the fine proximity sensor determines if the user enters or leaves the target area based on detecting if the user enters or leaves the fine detection range. In some embodiments, the fine proximity sensor is an active ranging sensor, which measures distance by emitting waves and calculating the distance based on the arrival time of the reflected waves. In some embodiments, the fine proximity sensor includes an infrared ranging sensor, an ultrasonic proximity sensor, and/or any other suitable sensor.

In some embodiments, the second sensor 220 is or includes a motion sensor with a detection range, and the parameter to be detected by the first sensor 220 is based on detecting a change of motions and/or vibration within the detection range of the motion sensor. In some embodiments, the motion sensor can be an accelerometer and/or any other suitable motion sensor.

In some embodiments, the second sensor 220 is or includes a temperature sensor with a detection range, and the parameter to be detected by the second sensor 220 is based on detecting a change of temperatures within the detection range of the temperature sensor. In some embodiments, the motion sensor can be an infrared thermopile sensor and/or any other suitable temperature sensor.

In some embodiments, the second sensor 220 can include more than one type of sensor, such as a proximity sensor (for example, a passive infrared sensor), an ambient light sensor, a photoelectric sensor, an ultrasonic sensor, a time of flight distance sensor, a thermopile sensor, or any other suitable sensors or combination of sensors.

In some embodiments, the second sensor 220 has a detection range that is smaller than the detection range of the first sensor 210, but the second sensor 220 can be more accurately detect whether or not a user enters or leaves the detection range of the second sensor 220.

At step 412, the second sensor 220 sends the detection result back to the processor 240.

In some embodiments, once the sensor system 106 determines that a user enters or leaves an exercise device, it can send that information to other components of the environment 100. In some embodiments, one or more components of the environment 100 can use that information to start or finish recording the user's exercise data and/or the exercise device's operation data. In some embodiments, one or more components of the environment 100 can use that information to start or finish its operation. In some embodiments, one or more components of the environment 100 can use that information to toggle between different power modes, such as between an active mode and a low power mode.

In some embodiments, if the sensor system 106 is battery-operated, the sensor system 106 can send battery information, such as a brownout event, to the gateway of the server 104, so that gym operators can be timely informed to replace the battery of the sensor system.

In some embodiments, regardless the exercise device is used or not, the sensor system 106 can periodically report its run-time status and statistics to the gateway, for book-keeping and diagnosis purpose of the sensor system 106 and/or the exercise device.

In some embodiments, the sensor system 106 can receive commands from the gateway, such as flashing an LED included in the sensor system 106 to identify itself, so that a gym operator can easily identify the sensor system 106.

In some embodiments, the server 104 may provide a front-end user interface (UI), such as a website, a dedicated PC, or a mobile application, for gym operators and/or trainers to access the users exercise activities, so that proper guidance, advice, and/or training can be provided to the users. In some embodiments, a user interface on mobile and/or web interface can also be provided to users on mobile devices, for the purpose to monitor and track their exercise activities, as described above.

In some embodiments, a user's detailed exercise information is collected and stored in the server 104. The information includes, but not limited to, start/end time and date, equipment type, duration, sets and repeats (for pin-loaded equipment, workbenches, and power racks), break intervals in all sessions recorded by the mobile device 112 and/or the sensor system 106 associated with exercise device. The data can be organized and displayed in many ways through the front-end user interface (UI).

In some embodiments, the aggregated data of all members collected through mobile devices 112 can be combined to track the equipment usage, improve operation efficiency of gyms, and provide more insights to optimize members' exercise routines.

In some embodiments, the same type of equipment can be grouped together. For a certain group, its total number of visiting members, total number of visits, and total operation time can be compared against those of other groups. If one group has significantly more users than another group, the gym can look into the scenarios and decide which group or groups need to add or reduce number of equipment.

In some embodiments, individual equipment can be compared against others of the same type, particularly when they are physically close. If one specific exercise device always has less member accesses than others or no member accesses, the gym operators may be informed to check the device. This may indicate that the exercise device has certain issues, such as a defect, being close to an environment that is not user-friendly, or something else that needs the gym operators' attention.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A system comprising:
a sensor system comprising a first sensor and a second sensor;
the first sensor configured to detect a first parameter that indicates a likelihood of having a user enters or exits a first target area associated with the first sensor and, in response, send a first command signal to a processor, wherein the first sensor comprises a coarse proximity sensor with a coarse detection range that corresponds with the first target area;
the second sensor configured to detect a second parameter that indicates the likelihood of having the user enters or exits a second target area associated with the second sensor, wherein the second sensor comprises a fine proximity sensor with a fine detection range that corresponds with the second target area;
a memory that stores a module; and
the processor, coupled to the first sensor, the second sensor, and the memory, configured to run the module that is configured to cause the processor to:
receive the first command signal from the first sensor,
send a second command signal to the second sensor based on receiving the first command signal, causing the second sensor to begin detection,
receive detection results from the second sensor determining that the user has entered or exited the second target area,
wherein the first sensor is a lower power sensor than the second sensor,
wherein the second sensor, with the fine proximity sensor, more accurately detects whether the user has entered or exited the second target area, where it overlaps with the first target area, as compared with the first sensor with the coarse proximity sensor,
wherein the coarse detection range of the first sensor covers more area than the fine detection range and the second target area of the second sensor;
wherein the processor is configured to be in sleep mode and is only switched to an active mode upon receiving the first command signal from the first sensor.

2. The system of claim 1, wherein the first sensor and the second sensor operate in an active mode and a sleep mode.

3. The system of claim 2, wherein when switched from the sleep mode to the active mode, the first sensor or the second sensor begin the detection, and when switched from the active mode to the sleep mode, the first sensor or the second sensor stop the detection.

4. The system of claim 2, wherein when both the first sensor and the second sensor are configured to switch between a high power/active mode and a low power/sleep mode, the first sensor remains at the high power/active mode longer than the second sensor.

5. The system of claim 2, wherein when the first sensor is in an always on mode, the second sensor switches from the sleep mode to the active mode upon receiving the second command signal.

6. The system of claim 1, further comprising a camera capable of capturing one or more pictures and/or video clips when the user enters or exits the first target area or the second target area.

7. The system of claim 6, wherein the first sensor, the second sensor and the camera are combined into one device and the one device is located non-intrusively on an exercise apparatus.

8. The system of claim 6, further comprising a gateway capable of detecting faces from the one or more pictures and/or video clips, wherein the gateway extracts facial features for the one or more pictures and/or video clips, and transmits the extracted features to a server for facial recognition and image storage.

9. A method comprising:
detecting, by a first sensor, a first parameter that indicates a likelihood of having a user enters or exits a first target area associated with the first sensor and, in response, send a first command signal to a processor, wherein the processor is configured to be in sleep mode and is only switched to an active mode upon receiving the first command signal from the first sensor, wherein the first sensor comprises a coarse proximity sensor with a coarse detection range that corresponds with the first target area;
detecting, by a second sensor, second parameter that indicates the likelihood of having the user enters or exits a second target area associated with the second sensor, wherein the second sensor comprises a fine proximity sensor with a fine detection range that corresponds with the second target area;
receiving, by the processor, the first command signal from the first sensor, and sending a second command signal to the second sensor based on receiving the first command signal, causing the second sensor to begin detection; and
receiving, by the processor, detection results from the second sensor determining that the user has entered or exited the second target area,
wherein the first sensor is a lower power sensor than the second sensor, and
wherein the second sensor, with the fine proximity sensor, more accurately detects whether the user has entered or exited the second target area, where it overlaps with the first target area, as compared with the first sensor with the coarse proximity sensor,
wherein the coarse detection range of the first sensor covers more area than the fine detection range and the second target area of the second sensor.

10. The method of claim 9, wherein the first sensor and the second sensor operate in an active mode and a sleep mode.

11. The method of claim 10, wherein when switched from the sleep mode to the active mode, the first sensor or the second sensor begin the detection, and when switched from the active mode to the sleep mode, the first sensor or the second sensor stop the detection.

12. The method of claim 10, wherein when both the first sensor and the second sensor are configured to switch between a high power/active mode and a low power/sleep mode, the first sensor remains at the high power/active mode longer than the second sensor.

13. The method of claim 9, wherein the coarse detection range is larger than the fine detection range.

14. The method of claim 9, further comprising a camera capable of capturing one or more pictures and/or video clips when the user enters or exits the first target area or the second target area.

15. A non-transitory computer readable medium having executable instructions operable to cause a processor to perform a method of:

receiving a first command signal from a first sensor;

sending a second command signal to a second sensor based on receiving the first command signal, causing the second sensor to begin detection; and receiving detection results from the second sensor determining that a user has entered or exited a second target area, wherein the first sensor is a lower power sensor than the second sensor, wherein the first sensor configured to detect a first parameter that indicates a likelihood of having the user enters or exits a first target area associated with the first sensor and, in response, send the first command signal to the processor, wherein the first sensor comprises a coarse proximity sensor with a coarse detection range that corresponds with the first target area, and wherein the second sensor configured to detect a second parameter that indicates the likelihood of having the user enters or exits the second target area associated with the second sensor, wherein the second sensor comprises a fine proximity sensor with a fine detection range that corresponds with the second target area, wherein the second sensor, with the fine proximity sensor, more accurately detects whether the user has entered or exited the second target area, where it overlaps with the first target area, as compared with the first sensor with the coarse proximity sensor, wherein the coarse detection range of the first sensor covers more area than the fine detection range and the second target area of the second sensor, wherein when the first sensor is in an always on mode, the second sensor switches from a sleep mode to an active mode upon receiving the second command signal.

16. The method of claim 15, wherein the first sensor and the second sensor operate in an active mode and a sleep mode, and wherein when switched from the sleep mode to the active mode, the first sensor or the second sensor begin the detection, and when switched from the active mode to the sleep mode, the first sensor or the second sensor stop the detection.

* * * * *